(12) United States Patent
Schweitzer, III et al.

(10) Patent No.: US 7,460,347 B2
(45) Date of Patent: Dec. 2, 2008

(54) SYSTEMS AND METHODS FOR PERFORMING A REDUNDANCY CHECK USING INTELLIGENT ELECTRONIC DEVICES IN AN ELECTRIC POWER SYSTEM

(75) Inventors: Edmund O. Schweitzer, III, Pullman, WA (US); Edmund A. Schweitzer, Pullman, WA (US); Tony J. Lee, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 437 days.

(21) Appl. No.: 11/345,033

(22) Filed: Feb. 1, 2006

(65) Prior Publication Data

US 2006/0193099 A1 Aug. 31, 2006

Related U.S. Application Data

(63) Continuation-in-part of application No. 11/211,816, filed on Aug. 25, 2005, which is a continuation-in-part of application No. 09/900,098, filed on Jul. 6, 2001, now Pat. No. 6,947,269.

(51) Int. Cl.
*H02H 7/00* (2006.01)
(52) U.S. Cl. ..................................... 361/62
(58) Field of Classification Search .............. 361/62
See application file for complete search history.

(56) References Cited

U.S. PATENT DOCUMENTS 4,540,849 A 9/1985 Oliver (Continued)

FOREIGN PATENT DOCUMENTS

WO WO 98/53332 11/1998

OTHER PUBLICATIONS

Abb Oy, Communicate LON OPC Server Buyer's Guide, Feb. 4, 2004.

(Continued)

*Primary Examiner*—Stephen W Jackson
(74) *Attorney, Agent, or Firm*—Eugene M. Cummings, P.C.

(57) ABSTRACT

Provided is an intelligent electronic device-to-intelligent electronic device direct communication system in a power system, for performing a power system data redundancy check therebetween. The communication includes a first intelligent electronic device adapted for deriving power system data from a selected portion of the power system. The first intelligent electronic device is associated with a first transmit module for transmitting the derived power system data. A second intelligent electronic device is further provided and adapted for deriving power system data from the selected portion of the power system, wherein the second intelligent electronic device is associated with a first receive module. The first receive module of the second intelligent electronic device is coupled to the first transmit module of the first intelligent electronic device via a communication link, such that the first receive module is adapted to receive the derived power system data transmitted by the first intelligent electronic device. The second intelligent electronic device is further adapted to provide a redundancy check between the first and second intelligent electronic devices by comparing the power system data derived by the second intelligent electronic device with the power system data transmitted thereto from the first intelligent electronic device. In other embodiments, the power system data transmission can be bidirectional and redundancy check can be performed in both intelligent electronic devices.

55 Claims, 10 Drawing Sheets

U.S. PATENT DOCUMENTS

| | | | |
|---|---|---|---|
| 4,646,084 A | 2/1987 | Burrowes et al. | |
| 4,682,102 A | 7/1987 | Milkovic | |
| 4,754,219 A | 6/1988 | Milkovic | |
| 4,786,863 A | 11/1988 | Milkovic | |
| 4,881,070 A | 11/1989 | Burrowes et al. | |
| 4,999,572 A | 3/1991 | Bickford et al. | |
| 5,229,713 A | 7/1993 | Bullock et al. | |
| 5,369,691 A | 11/1994 | Cain et al. | |
| 5,627,759 A | 5/1997 | Bearden et al. | |
| 5,719,564 A | 2/1998 | Sears | |
| 5,793,750 A * | 8/1998 | Schweitzer, III et al. | 370/242 |
| 5,974,369 A | 10/1999 | Radtke et al. | |
| 5,982,595 A * | 11/1999 | Pozzuoli | 361/62 |
| 6,160,806 A * | 12/2000 | Cantwell et al. | 370/360 |
| 6,275,168 B1 | 8/2001 | Slater et al. | |
| 6,278,357 B1 | 8/2001 | Croushore et al. | |
| 6,429,785 B1 | 8/2002 | Griffin et al. | |
| 6,493,644 B1 | 12/2002 | Jonker et al. | |
| 6,611,772 B1 | 8/2003 | Lavoie et al. | |
| 6,622,097 B2 | 9/2003 | Hunter | |
| 6,633,823 B2 | 10/2003 | Bartone et al. | |
| 6,675,071 B1 | 1/2004 | Griffin | |
| 6,687,627 B1 | 2/2004 | Gunn et al. | |
| 6,737,984 B1 | 5/2004 | Welles, II et al. | |
| 6,751,563 B2 | 6/2004 | Spanier et al. | |
| 6,792,364 B2 | 9/2004 | Jonker et al. | |
| 6,832,339 B1 | 12/2004 | Reed et al. | |
| 6,836,737 B2 | 12/2004 | Petite et al. | |
| 6,859,742 B2 | 2/2005 | Randall et al. | |
| 6,874,691 B1 | 4/2005 | Hildebrand et al. | |
| 6,906,507 B2 | 6/2005 | Briese et al. | |
| 2001/0010032 A1 | 7/2001 | Ehlers et al. | |
| 2002/0019712 A1 | 2/2002 | Petite et al. | |
| 2002/0094799 A1 | 7/2002 | Eliott | |
| 2002/0109607 A1 | 8/2002 | Cumeralto et al. | |
| 2003/0046409 A1 | 3/2003 | Graham | |
| 2003/0048199 A1 | 3/2003 | Zigdon et al. | |
| 2004/0008023 A1 | 1/2004 | Jang et al. | |
| 2004/0138835 A1 | 7/2004 | Ransom et al. | |
| 2004/0174271 A1 | 9/2004 | Welles, II et al. | |
| 2005/0132115 A1 | 6/2005 | Leach | |

OTHER PUBLICATIONS

Abb Oy, LON OPC Server Installation and Commissioning Guide, Aug. 30, 2001.

Abb Oy, OPC Servers Software Solutions (Product Flyer), Mar. 2004.

Electro Industries/Gaugetech, SBM Series KWH & Demand Meters (Product Flyer).

Echelon Corporation, DC-1000 Data Concentrator (Product Flyer), 2005.

Echelon Corporation, NES System Software (Product Flyer), 2005.

Echelon Corporation, EM-1021 Single-Phase IEC Residential Electricity Meter (Product Flyer), 2005.

* cited by examiner

US 7,460,347 B2

SYSTEMS AND METHODS FOR PERFORMING A REDUNDANCY CHECK USING INTELLIGENT ELECTRONIC DEVICES IN AN ELECTRIC POWER SYSTEM

RELATED APPLICATIONS

This application is a continuation-in-part of U.S. patent application Ser. No. 11/211,816 entitled "RELAY-TO-RELAY DIRECT COMMUNICATION SYSTEM IN AN ELECTRICAL POWER SYSTEM", filed Aug. 25, 2005, which is continuation-in-part of U.S. patent application Ser. No. 09/900,098 filed Jul. 6, 2001, U.S. Pat. No. 6,947,269 entitled "RELAY-TO-RELAY DIRECT COMMUNICATION SYSTEM IN AN ELECTRICAL POWER SYSTEM", issued Sep. 20, 2005.

BACKGROUND OF THE INVENTION

1. Field of the Invention

This invention relates generally to systems and methods for performing a power system data redundancy check in an electric power system, and more specifically to systems and methods including at least one intelligent electronic device which compares received and derived power system data as an effective way to detect problems such as device failure, monitoring inaccuracies and security issues.

2. Description of Related Art

Electric utility systems or power systems are designed to generate, transmit and distribute electrical energy to loads. In order to accomplish this, electric power systems generally include a variety of power system elements such as electrical generators, electrical motors, power transformers, power transmission lines, buses and capacitors, to name a few. As a result, power systems also include intelligent electronic devices for monitoring, protecting, controlling, metering and/or automating power system elements and associated transmission lines.

It is desirable to transmit power system data between intelligent electronic devices for performing a redundancy check to address device failure, monitoring inaccuracies and security issues, including tampering of the intelligent electronic devices at each respective location. Redundancy checks also improve reliability and service downtime.

In one aspect of the present invention, one or more intelligent electronic devices may be adapted to transmit power system data to another intelligent electronic device. The other intelligent electronic device is adapted to compare the received power system data to its own derived power system data, thereby performing a redundancy check. In this arrangement, a third device is not necessary in achieving redundancy check functionality.

For example, revenue meters are intelligent electronic devices generally used to monitor or record, among other things, power consumption by an end user. It is desirable to perform a redundant or validation check of a revenue meter in order to monitor and ensure the accuracy thereof. This process is typically referred to as redundant metering.

Although the traditional systems as described below generally involve meters, such systems may further be implemented into any intelligent electronic device having redundancy check capabilities. Similarly, although the examples of the multiple embodiments of the present invention described herein sometime refer to "meters", it should be understood that the apparatus, system, and method described with respect to the present invention herein is applicable any intelligent electronic device having redundancy check capabilities. In addition to meters, examples of such intelligent electronic devices may include among other things protective relays, recloser controls, I/O processor and controllers, communication processors, Synchrophasors, capacitor bank controllers, or any other intelligent electronic devices having redundancy check capabilities.

Traditional systems for providing redundant metering include having an inspector physically monitor the functionality of a meter by comparing such to another meter. Other traditional systems for providing redundant metering functionality, or if providing a redundancy check, between other types of intelligent electronic devices generally require additional components or devices for providing the redundancy check between or among intelligent electronic devices.

For example, another traditional arrangement for providing redundant metering includes implementing a supervisory control and data acquisition (SCADA) system associated with a plurality of meters. In this arrangement, a host computer provides supervisory control over remote terminal units (RTUs). One or more of the RTUs is associated with a plurality of meters. The meters in this arrangement typically include a meter for general revenue metering applications and another meter for sampling selected power system data. Yet another separate intelligent electronic device is required to provide a redundancy check between the two meters. Communication between the meters may be typically controlled and monitored at the host computer or RTU level, and may be achieved through a communication link typically involving transmitting analog current outputs via DNP, modbus, Ethernet or other such data communications protocol. Although this system may be used to achieve real-time monitoring, this system requires a constant communication link, a number of communications components, multiple connections between the meters, and programming by a person trained in communications or SCADA applications. Moreover, this system generally includes a third intelligent electronic device for providing redundancy check functionality. The third device is often located off-site from the other intelligent electronic devices. This off-site location is often less secured, thereby causing this means for transmitting data to also be less secure.

Accordingly, it is an object of the present invention to provide one or more intelligent electronic devices which may be adapted to transmit power system data to another intelligent electronic device, whereupon the other intelligent electronic device is adapted to receive such data and compare the received data to its own power system data, thereby performing a redundancy check therebetween. In this arrangement, a third device is not necessary in achieving redundancy check functionality.

It is further an object of the invention to provide a secure, noise resistant and tamperproof method for providing a redundancy check between intelligent electronic devices, whereupon only one communication link is required. In U.S. Pat. No. 5,793,750, the contents of which are hereby incorporated by reference, a communication system between two microprocessor-based protective relays for an electric power system is disclosed. Each of the two relays in that system has both transmit and receive modules, for directly transmitting indication status bits indicative of the result of selected protective functions of one relay from that one relay to the other, and vice versa.

The output status indication bits are sometimes used to identify the existence and location of a fault on the power line portion served by the two relays. One or both of the relays might initiate a circuit breaker trip action on the basis of the exchange of such information. The output status indication bits may be the result of processing functions in one of the relays involving the voltages and/or currents on the power line. The output status indication bits may be used for various control, status, indication and protection functions. Examples of protection functions include permissive overreaching transfer trip (POTT) actions, permissive under-reaching transfer trip (PUTT) actions, directional comparison unblocking (DCUB) and direct transfer trip (DTT) actions. Other relay-to-relay operations are possible using particular output status indication bits.

The advantage of the communication system described in the '750 application is that it is fast and secure. Protective relays typically accomplish their monitoring functions several times each power system cycle. The '750 communication system provides the results of these monitoring functions of one relay, to the other relay. The information is transmitted directly over a communication link from an originating relay, which may or may not trip its associated circuit breaker based on its operational results, to another relay. The receiving relay then uses the transmitted information, in the form of digital bits, to perform its own on-going calculations, producing various protection actions such as tripping and closing a circuit breaker when appropriate. The communication between the two relays may be bi-directional, allowing the two relays to exchange information concerning the results of their own calculations both quickly and securely, with a minimum amount of expense.

Therefore, it is yet another object of the invention to provide one or more intelligent electronic devices adapted to transmit and receive indication status bits in the form of successive data stream messages indicative of selected power system quantities of one intelligent electronic device from that one intelligent electronic device to the other, and vice versa in order to perform a redundancy check therebetween.

BRIEF SUMMARY OF THE INVENTION

An intelligent electronic device is provided which derives power system data from measured power system quantities. In one embodiment, provided is an intelligent electronic device-to-intelligent electronic device communication system in an electric power system for performing a power system data redundancy check. The communication system generally includes a first intelligent electronic device adapted for deriving power system data from a selected portion of the power system. The first intelligent electronic device is associated with a first transmit module for transmitting the derived power system data.

A second intelligent electronic device is further provided and adapted for deriving power system data from the selected portion of the power system, wherein the second intelligent electronic device is associated with a first receive module. The first receive module of the second intelligent electronic device is coupled to the first transmit module of the first intelligent electronic device via a communication link, such that the first receive module is adapted to receive the derived power system data transmitted by the first intelligent electronic device. The second intelligent electronic device is further adapted to provide a redundancy check between the first and second intelligent electronic devices by comparing the power system data derived by the second intelligent electronic device with the power system data transmitted thereto from the first intelligent electronic device.

In various embodiments of the invention, the communication link between the first and second intelligent electronic devices can be in the form of wired or wireless communications. The wired communication link includes sending analog pulses, digitized serial or parallel data through direct channel to channel contacts, fiber channels, fiber optics, telephone lines, power line carrier, Ethernet networks, Local Optical Networks (LONs) or any other type of suitable link adapted to carry time-synchronized digitized analog signal or analog signal. The wireless communications include microwave links, RF links, audio, and infrared links.

In another embodiment of the invention, the intelligent electronic device-to-intelligent electronic device direct communication system is adapted to transmit the power system data via a variety of bit-lengths in the form of successive data stream messages.

In yet another embodiment of the invention, a method of performing a redundancy check between a first intelligent electronic device and a second intelligent electronic device is provided. The method generally includes the steps of deriving power system data from a selected portion of a power system using the first intelligent electronic device; transmitting, via a communication link, the derived power system data from the first intelligent electronic device to the second intelligent electronic device; receiving the derived power system data from the first intelligent electronic device using the second intelligent electronic device; sampling power system data from the selected portion of the power system using the second intelligent electronic device; and comparing, via a comparator in the second intelligent electronic device, the power system data derived by the second intelligent electronic device with the power system data transmitted by the first intelligent electronic device.

DETAILED DESCRIPTION OF THE INVENTION

Figure 1:
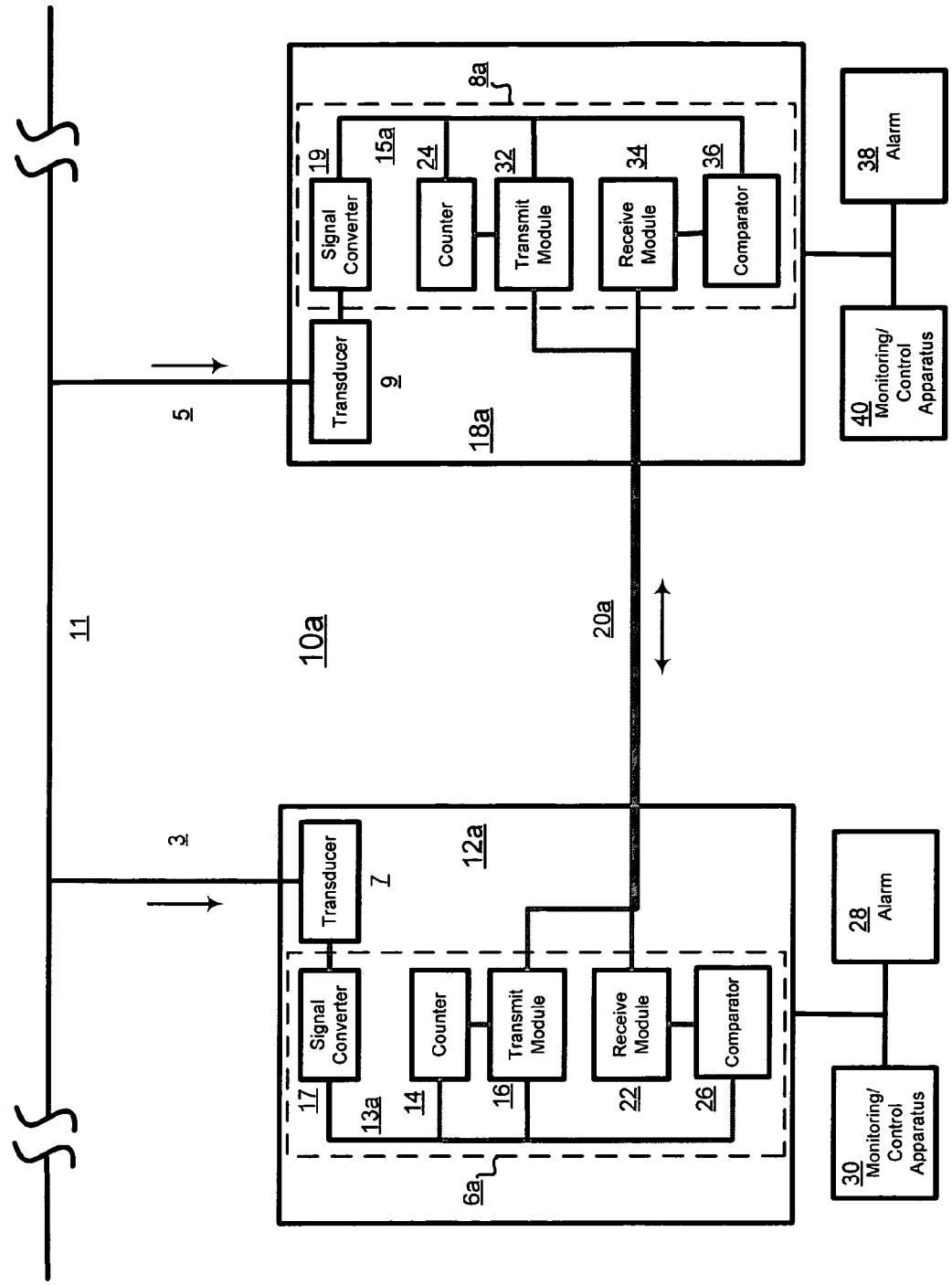
FIG. 1 is a block diagram of an intelligent electronic device-to-intelligent electronic device bidirectional communication system according to an embodiment of the invention for performing a power system data redundancy check.

FIG. 1 is a block diagram of an intelligent electronic device-to-intelligent electronic device bidirectional communication system 10a according to an embodiment of the invention for performing a power system data redundancy check from derived power system data. In this embodiment, a first and second intelligent electronic device 12a and 18a may or may not be identical, but are adapted for measuring power system quantities 3 and 5 associated with a selected portion of a power system 11. Power system quantities 3 and 5 may be measured at the same node on the power system 11 or may be at different nodes at some distance apart.

For example, the intelligent electronic devices 12a and 18a may be in the form of meters on power system 11. In this particular example, intelligent electronic devices 12a and 18a measures power system quantities 3 and 5 such as volts and amps through transducers 7 and 9 and, from these power system quantities, derives power system data 13a and 15a such as watts, VARs, volt-amperes, volts, amperes, Watt-hours, VAR-hours, Volt-hours, Ampere hours, VA-hours, frequency, harmonics, vectors of voltages and currents such as the phase angles and magnitudes, etc. through signal converters 17 and 19.

Signal converters 17 and 19 may each include each include analog to digital converters (ADC) or any other equivalent device that converts analog signals to digital format. Signal converters 17 and 18 may each further a device for generating pulse counts such as an optical electromechanical disk. In this embodiment, the power system data 13a and 15a may be in the form of KYZ pulses transmitted directly through transmit modules 16 and 32 to the corresponding receive modules 34 and 22. The intelligent electronic devices 12a and 18a further include counters 14 and 24 for counting the corresponding KYZ pulses. The counted pulses are transmitted through respective transmit modules 16 and 32 to the corresponding receive modules 34 and 22 via a wired or wireless communication link 20a as defined herein.

In the embodiment of FIG. 1, the communication is bidirectional between intelligent electronic devices 12a and 18a. Respective comparators 26 and 36 in the first and second intelligent electronic devices 12a and 18a are coupled to the corresponding counters 14 and 24 for performing a power system data redundancy check using KYZ pulses. In order to provide a redundancy check for the first intelligent electronic device 12a, the comparator 36 of second intelligent electronic device 18a compares the power system data 13a (e.g., via pulses counted by counter 14) received from the first intelligent electronic device 12a with the power system data 15a (e.g., via pulses counted by counter 24) derived by the second intelligent electronic device 18a in the form of KYZ pulses.

More specifically, the comparator 36 may determine whether the difference between its power system data 15a (e.g., number of pulses counted) and the received power system data 13a (e.g., number of pulses counted) from the first intelligent electronic device 12a exceeds a select range or a value. Since the comparator 36 is part of the second intelligent electronic device 18a, a third intelligent electronic device with a comparator is not required for performing the redundancy check between the first and second intelligent electronic devices 12a and 18a. Similarly the first intelligent electronic device 12a may perform a redundancy check between the intelligent electronic devices 12a and 18a by its comparator 26.

In yet another embodiment, the comparators 26 or 36 may further be coupled to an alarm 28 or 38, for signaling an abnormal condition. In one example, the alarms 28 or 38 may signal when the difference between the power system data 13a and 15a exceeds a select range or value. Other causes for an abnormal condition to set off an alarm may include signaling when there is a severed communication link 20a, a power loss in intelligent electronic devices 12a or 18a, an intelligent electronic device failure, etc. When an alarm signal is sent by one of the intelligent electronic devices 12a or 18a, one or both intelligent electronic devices may be inspected and serviced in a timely manner, thereby avoiding the extended loss of metering revenue.

In another embodiment, the alarms 28 or 38 may further be in communication with a monitoring/control apparatus 30 or 40 by a suitable wired or wireless communication link. In this arrangement, a remote user may monitor or control the communication system 10a or, alternatively, each of the intelligent electronic devices 12a and 18a using the monitoring functionality of the monitoring/control apparatus 30 or 40. Occasionally, a simple corrective action such as sending a remote pulse or bit through a monitor/control apparatus 30 or 40 may clear or reset an alarm in either intelligent electronic device. The form of alarm signal includes any visual or audible alarm, contacts closure, digital messages, text messages, blinking LEDs, a phone call or an error bit. The monitoring/control apparatus 30 or 40 may further include a device to reset the alarms 28 or 38 and/or counters 24 or 14.

It shall be understood by those skilled in the art that each of the alarms 28 or 38 and monitoring/control apparatus 30 or 40 may be situated within or remotely communicating with either of the corresponding intelligent electronic devices 18a or 12a without deviating from the spirit of the invention. Each of the counters 14 and 24 may be reset based in response to an internal or external command to synchronize the first and second intelligent electronic devices 12a, 18a.

In another embodiment, the transmit modules 16, 32 and receive modules 34 and 22 may be separate and external, but in communication with their respective intelligent electronic devices 12a and 18a. In this manner, the transmit modules 16, 32 and receive modules 34, 22 are respectively associated with the intelligent electronic devices 12a and 18a. An example of such arrangement is separate and functional I/O modules as a third or a fourth intelligent electronic device (not shown) interfacing with the corresponding intelligent electronic devices 12a and 18a to establish a communication link 20a. Yet in another embodiment, the functions of the signal converter 17, the counter 14, the transmit module 16, the receive module 22 and comparator 26 may be integrated and replaced by a single microcontroller 6a in the first intelligent electronic device 12a; and likewise as microcontroller 8a in the second intelligent electronic device 18a.

Figure 2:
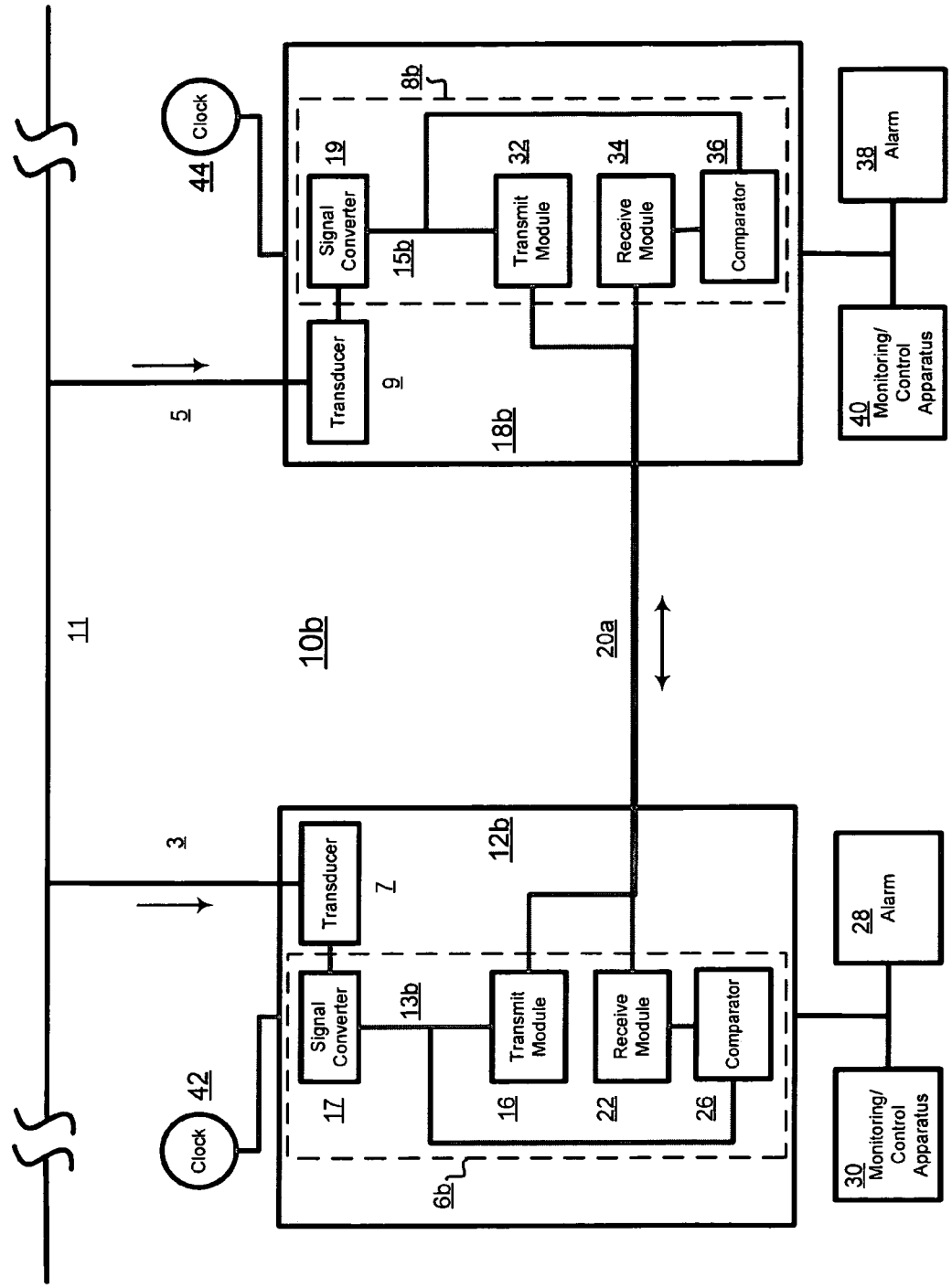
FIG. 2 is a block diagram of an intelligent electronic device-to-intelligent electronic device bidirectional communication system according to another embodiment of the invention for performing a power system data redundancy check.

FIG. 2 is a block diagram of an intelligent electronic device-to-intelligent electronic device bidirectional communication system 10b according to another embodiment of the invention for performing a power system data redundancy check using measured power system quantities 3 and 5. From these power system quantities, power system data 13a b and 15b such as watts, VARs, volt-amperes, volts, amperes, Watt-hours, VAR-hours, Volt-hours, Ampere hours, VA-hours, frequency, harmonics, vectors of voltages and currents such as the phase angles and magnitudes, etc. are derived through signal converters 17 and 19. Intelligent electronic devices 12b and 18b of FIG. 2 are generally similar to devices 12a and 18a of FIG. 1. However, instead of having a device for generating pulses as shown in FIG. 1, the signal converters 17 and 19 may be associated with the microprocessors' internal clock (not shown). For example, after the ADC in either signal converter 17 or 19 converts analog signals to digital format, the associated microprocessor 6b or 8b time-synchronizes the signals through its internal clock (not shown). The resulting time-integrated power system quantities may be in the form of watt-hours, VAR-hours, volt-ampere-hours, volt-hours, and ampere-hours.

Intelligent electronic devices 12b and 18b also do not include counters 14 and 24 as shown in FIG. 1 because the power system data 13b and 15b are represented in time-integrated power system quantities and do not require the counting of any KYZ pulses. The respective power system data 13b and 15b is transmitted and received through the communication link 20a and compared by the corresponding comparators 26 and 36 in intelligent electronic devices 12b or 18b for performing a power system data redundancy check. This arrangement is similar to that described with regards to FIG. 1; however, the time-integrated power system quantities, rather than the counted KYZ pulses, are compared. In this embodiment, the comparison function in comparators 26 and 36 may be performed by a digital processor or a discrete analog circuit in order to compare the digitized analog signals.

Alternatively, in yet another embodiment, the intelligent electronic devices 12b or 18b may further communicate with respective external clocks 42 or 44, such as a satellite clock, which may be used as time reference to synchronize the power system data 13b and 15b for transmitting, receiving and/or deriving power system data.

In another embodiment, the power system data 13b and 15b may be stored with a time stamp in a local memory (not shown) for redundancy check at a later time. If the difference of the power system data 13b and 15b exceeds a select a range or a value, at least one of the alarms 28 or 38 will send an alarmed signal.

Figure 3A:
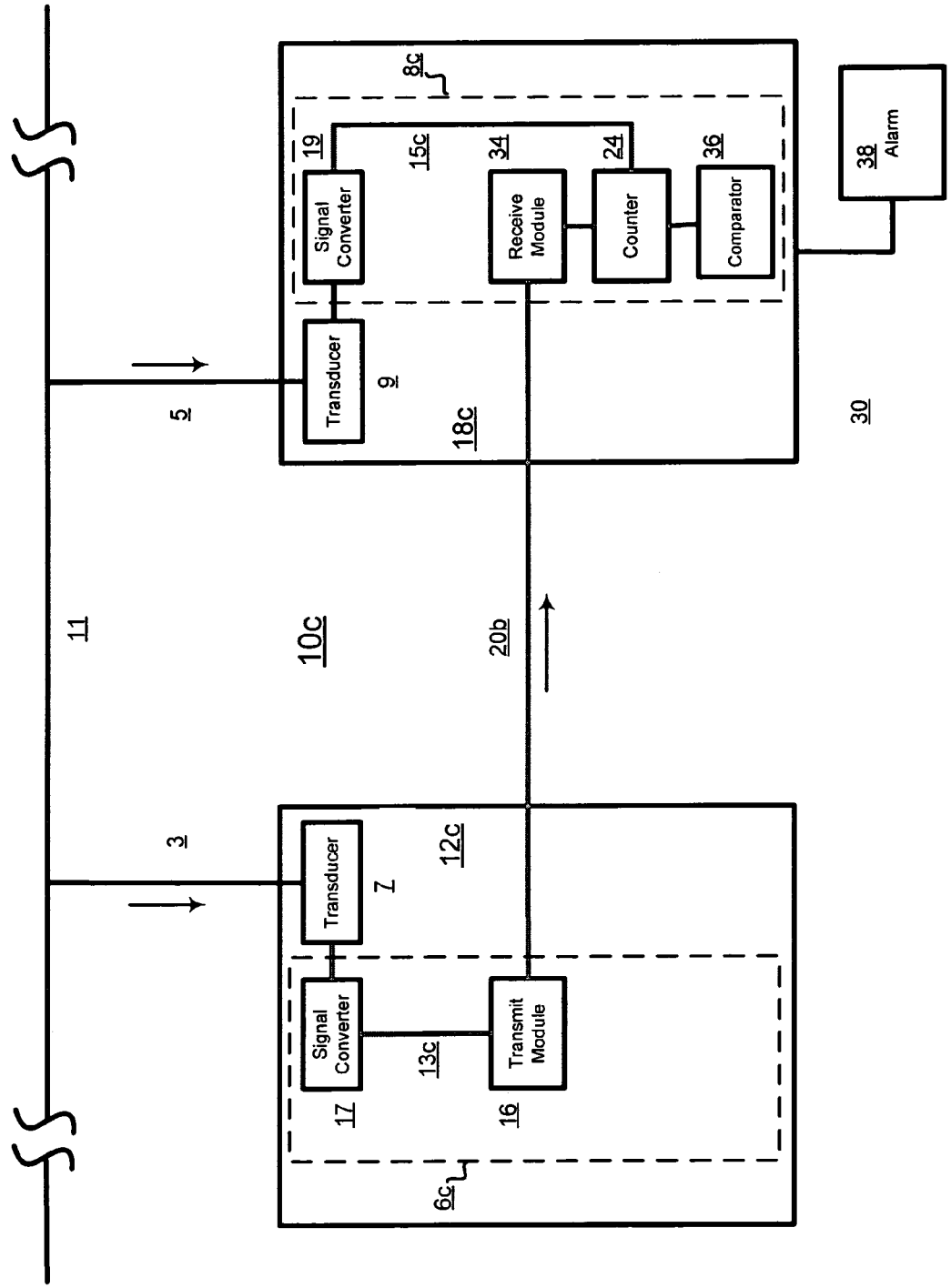
FIG. 3a is a block diagram of a general intelligent electronic device-to-intelligent electronic device communication system according to an embodiment of the invention for performing a power system data redundancy check.

FIG. 3a is a block diagram of a general intelligent electronic device-to-intelligent electronic device direct communication system 10c according to another embodiment of the invention for performing a power system data redundancy check using dissimilar basic intelligent electronic devices 12c and 18c. In this embodiment, both the first and second intelligent electronic devices 12c and 18c measure power system quantities 3 and 5 and derive power system data 13c and 15c in the form of KYZ pulses. The first intelligent electronic device 12c transmits the power system data 13c through transmit module 16 to the receive module 34 of second intelligent electronic device 18c. The counter 24 counts the KYZ pulses power system data 13c from the receive module 34.

The second intelligent electronic device 18c measures power system quantities 5 and sends the derived power system data 15c in the form of KYZ pulses to the counter 24. The comparator 36 in intelligent electronic device 18c compares its power system data 15c (via the counted KYZ pulses of intelligent electronic device 18c) with the received power system data 13c (via the counted KYZ pulses from intelligent electronic device 12c), thereby performing the redundancy check between the two devices 12c and 18c. If the difference of the power system data 13c and 15c exceeds a select range or a value, an alarm 38 in the second intelligent electronic device 18c will send an alarm signal. In this intelligent electronic device-to-intelligent electronic device communication system 10c, the communication link 20b is one way (rather than bidirectional) from intelligent electronic devices 12c to 18c. It is further contemplated that other components as described with regard to FIGS. 1 and 2 may further be integrated into this system as microprocessors 6c, 8c (e.g., control device, monitoring device, external clock, etc.).

Figure 3B:
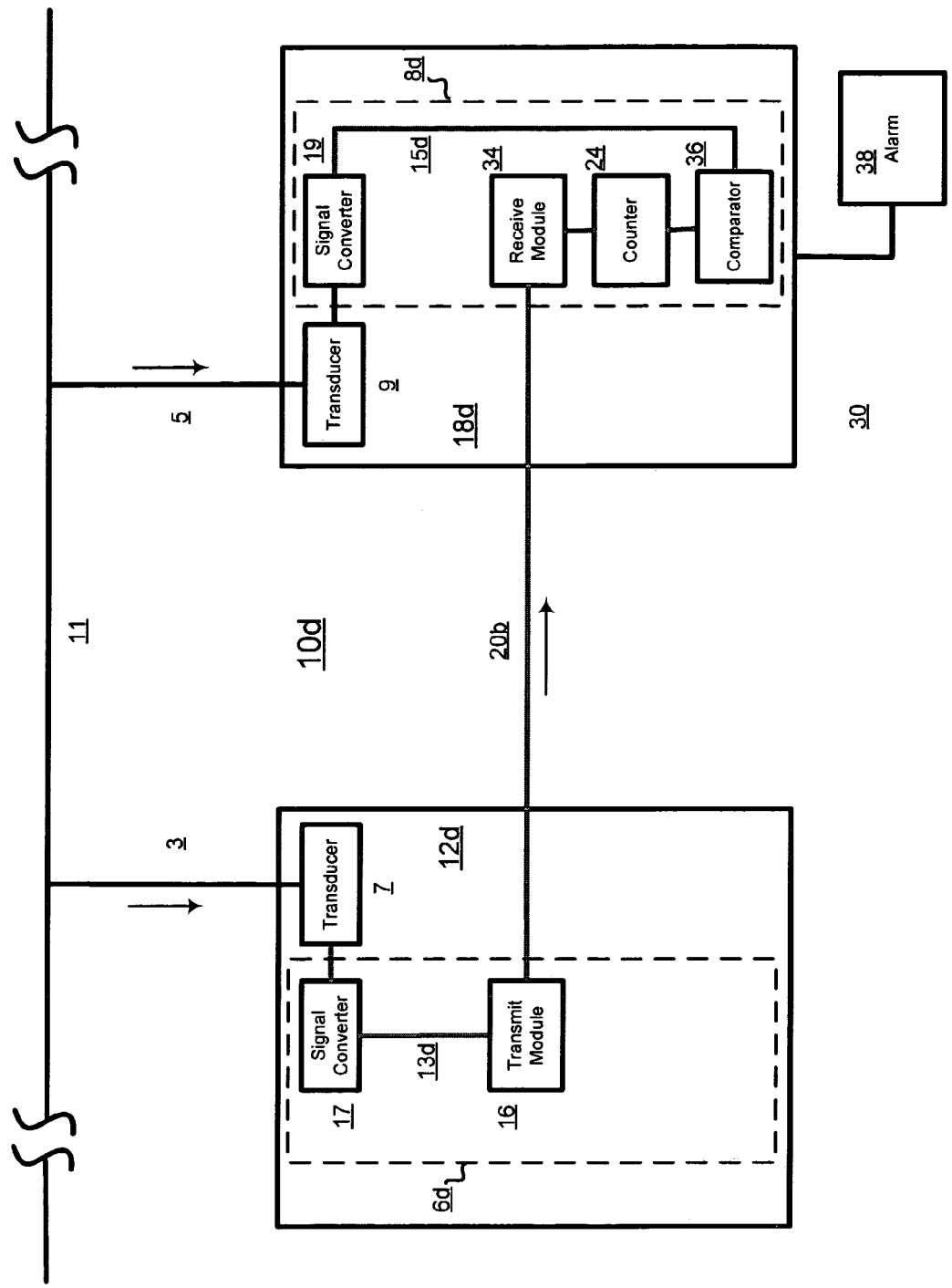
FIG. 3b is a block diagram of a general intelligent electronic device-to-intelligent electronic device communication system according to an embodiment of the invention for performing a power system data redundancy check.

FIG. 3b is a block diagram of a general intelligent electronic device-to-intelligent electronic device direct communication system 10d according to another embodiment of the invention for performing a power system data redundancy check using dissimilar basic intelligent electronic devices 12d and 18d. In this embodiment, both the first and second intelligent electronic devices 12d and 18d measure power system quantities 3 and 5 and derive power system data 13c and 15d, respectively. The first intelligent electronic device 12d in this embodiment is similar to the first intelligent electronic device 12c of FIG. 3a. Accordingly, the first intelligent electronic device 12d of this embodiment derives power system data 13d in the form of KYZ pulses and transmits such through transmit module 16 to the receive module 34 of second intelligent electronic device 18d. The counter 24 counts the KYZ pulses power system data 13d from the receive module 34.

The second intelligent electronic device 18d measures power system quantities 5. From these power system quantities, power system data 15d such as watts, VARs, volt-amperes, volts, amperes, frequency, harmonics, vectors of voltages and currents such as the phase angles and magnitudes, etc. are derived through signal converter 19. After the signal converter 19 converts analog signals to digital format, the associated microprocessor 8d time-synchronizes the signals through its internal clock (not shown). The resulting time-integrated power system quantities 15d may be in the form of watt-hours, VAR-hours, volt-ampere-hours, volt-hours, and ampere-hours.

In order to perform a redundancy check, the comparator 36 in intelligent electronic device 18d compares its power system data 15d (via time-integrated power system quantities derived by intelligent electronic device 18d) with the received power system data 13d (via the counted KYZ pulses from intelligent electronic device 12d). If the difference of the power system data 13d and 15d exceeds a select range or a value, an alarm 38 in the second intelligent electronic device 18d will send an alarm signal. In this intelligent electronic device-to-intelligent electronic device communication system 10d, the communication link 20b is one way (rather than bidirectional) from intelligent electronic devices 12d to 18d. It is further contemplated that other components as described with regard to FIGS. 1 and 2 may further be integrated into this system as microprocessors 6d, 8d (e.g., control device, monitoring device, external clock, etc.).

Figure 4:
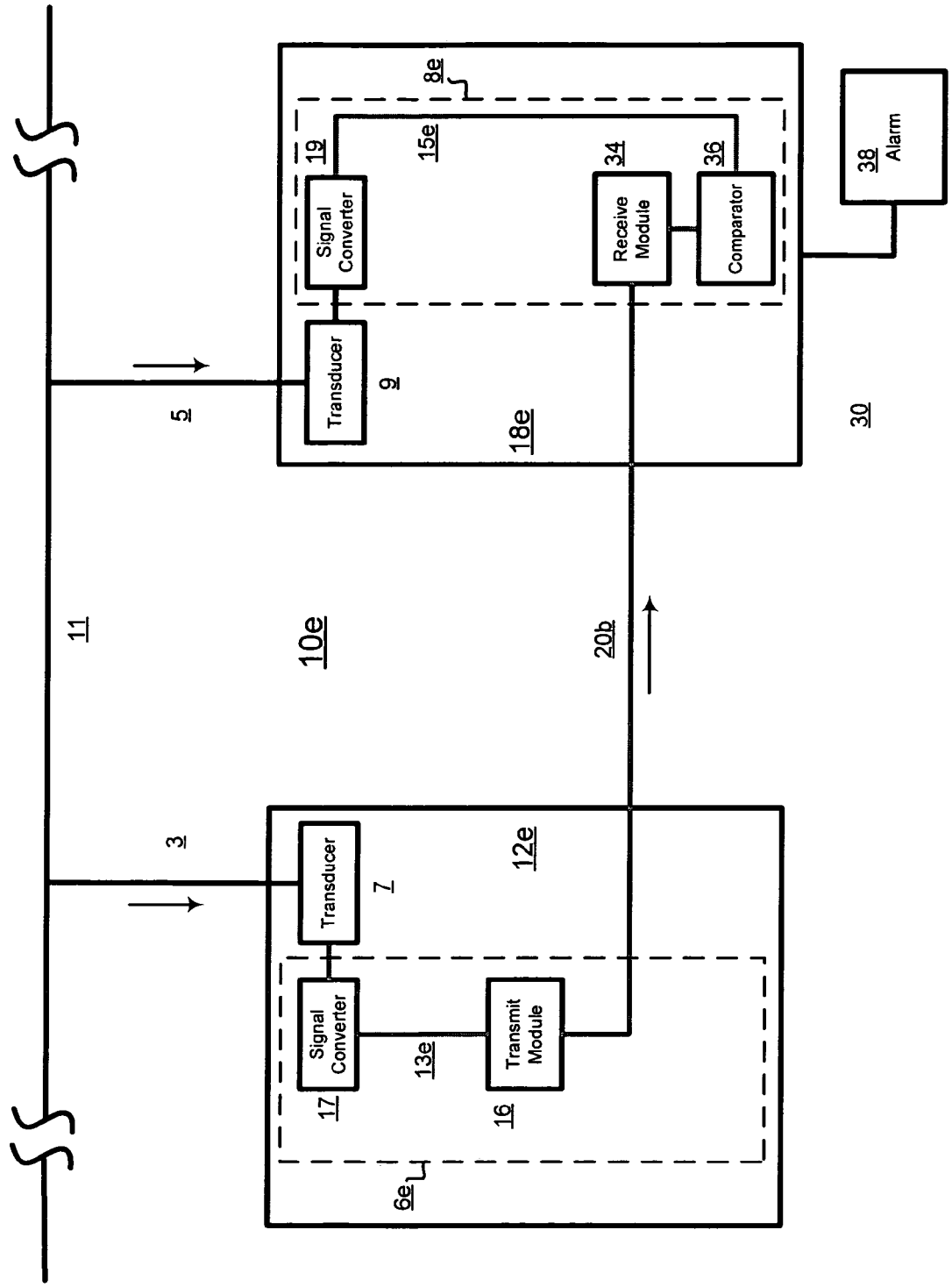
FIG. 4 is a block diagram a general intelligent electronic device-to-intelligent electronic device communication system according to another embodiment of the invention for performing a power system data redundancy check.

FIG. 4 is a block diagram of a general intelligent electronic device-to-intelligent electronic device direct communication system 10e according to another embodiment of the invention for performing a power system data redundancy check on power system data 13e and 15e using basic dissimilar intelligent electronic devices 12e and 18e. This embodiment is similar to the embodiment illustrated in FIG. 3B, except that the communication is one way (rather than bidirectional) from intelligent electronic devices 12e to 18e.

Accordingly, only one comparator is needed to perform a redundancy check. In this embodiment, both the first and second intelligent electronic devices 12e and 18e measure power system quantities 3 and 5 and derive power system data 13e and 15e in the form of digitized analog signals. After the signal converters 17 and 19 convert the associated analog signals to digital format, the associated microprocessor 6e and 8e may time-synchronize the signals through their internal clock (not shown). The first intelligent electronic device 12e transmits its derived power system data 13e through transmit module 16 to the receive module 34 of second intelligent electronic device 18e.

In order to perform a redundancy check, the comparator 36 in intelligent electronic device 18e compares its power system data 15e with the received power system data 13e. It is further contemplated that other components as described with regard to FIGS. 1 and 2 may further be integrated into this system as microprocessors 6e, 8e (e.g., control device, monitoring device, external clock, etc.).

Figure 5:
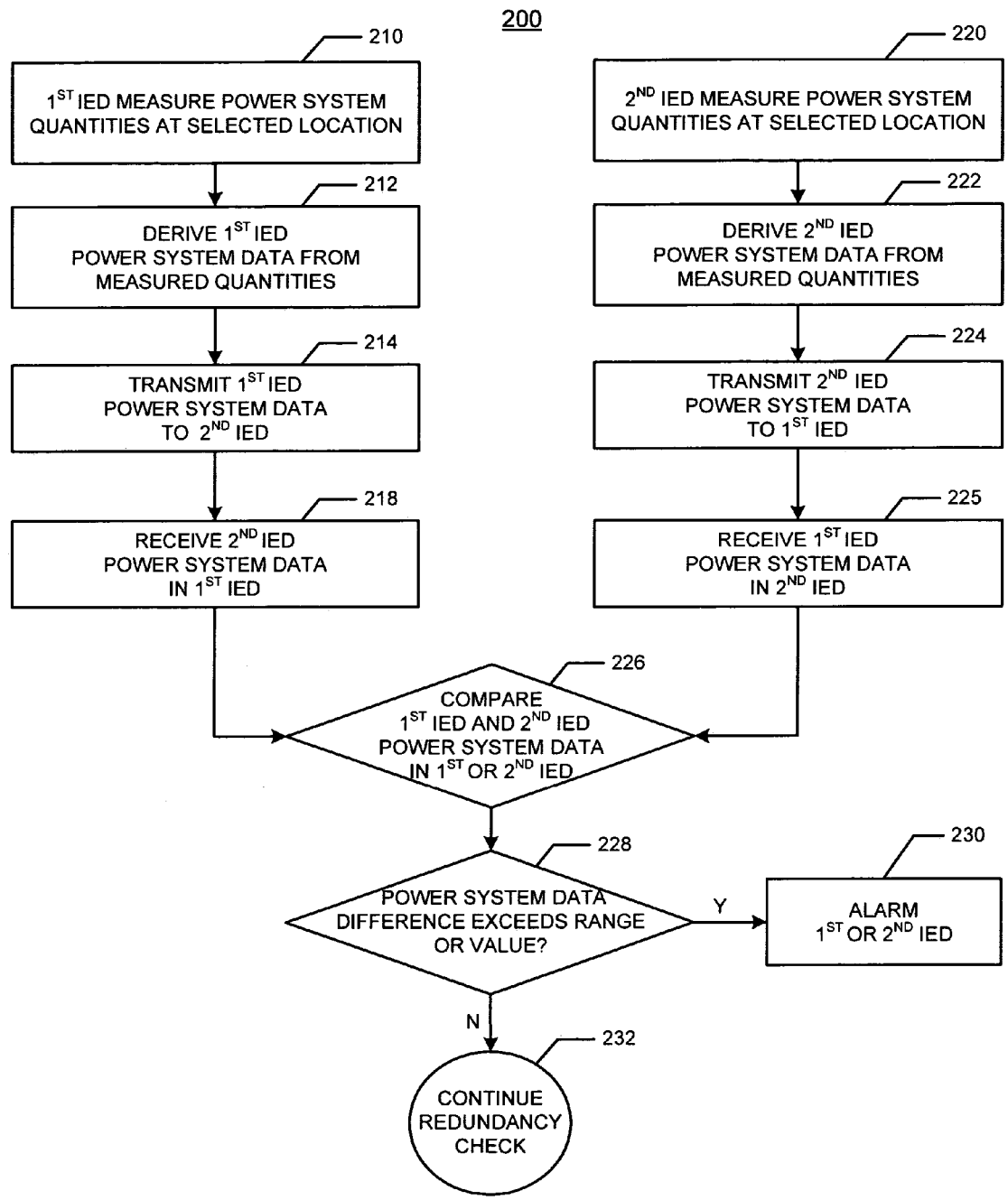
FIG. 5 is a flow chart depicting a method for performing a power system data redundancy check with bidirectional communication.

FIG. 5 is a flow chart depicting a method for performing a power system data redundancy check using measured power system quantities with bidirectional communication. This method applies to the embodiments including, but not limited to FIGS. 1 and 2; wherein the first and second intelligent electronic devices may or may not be identical. Steps 210 and 220 takes place concurrently in the first and second intelligent electronic devices measuring power system quantities at selected location, wherein the selected location may be at the same node or at different nodes some distance apart from each other. Steps 212 and 222 calculate and derive the power system data from each corresponding intelligent electronic device. Steps 214 and 224 cross transmit the power system data of the two corresponding intelligent electronic devices to each other. Steps 218 and 225 cross receive the power system data of the two corresponding intelligent electronic devices from each other. Step 226 compares the power system data between the first and second intelligent electronic devices in at least one of the intelligent electronic devices in each corresponding comparator. Step 228 determines if the difference between the power system data exceeds a select range or a value. If so, an alarm signal is sent by at least one of the intelligent electronic devices in step 230; if not, the measurements and redundancy checks continue in step 232.

Figure 6:
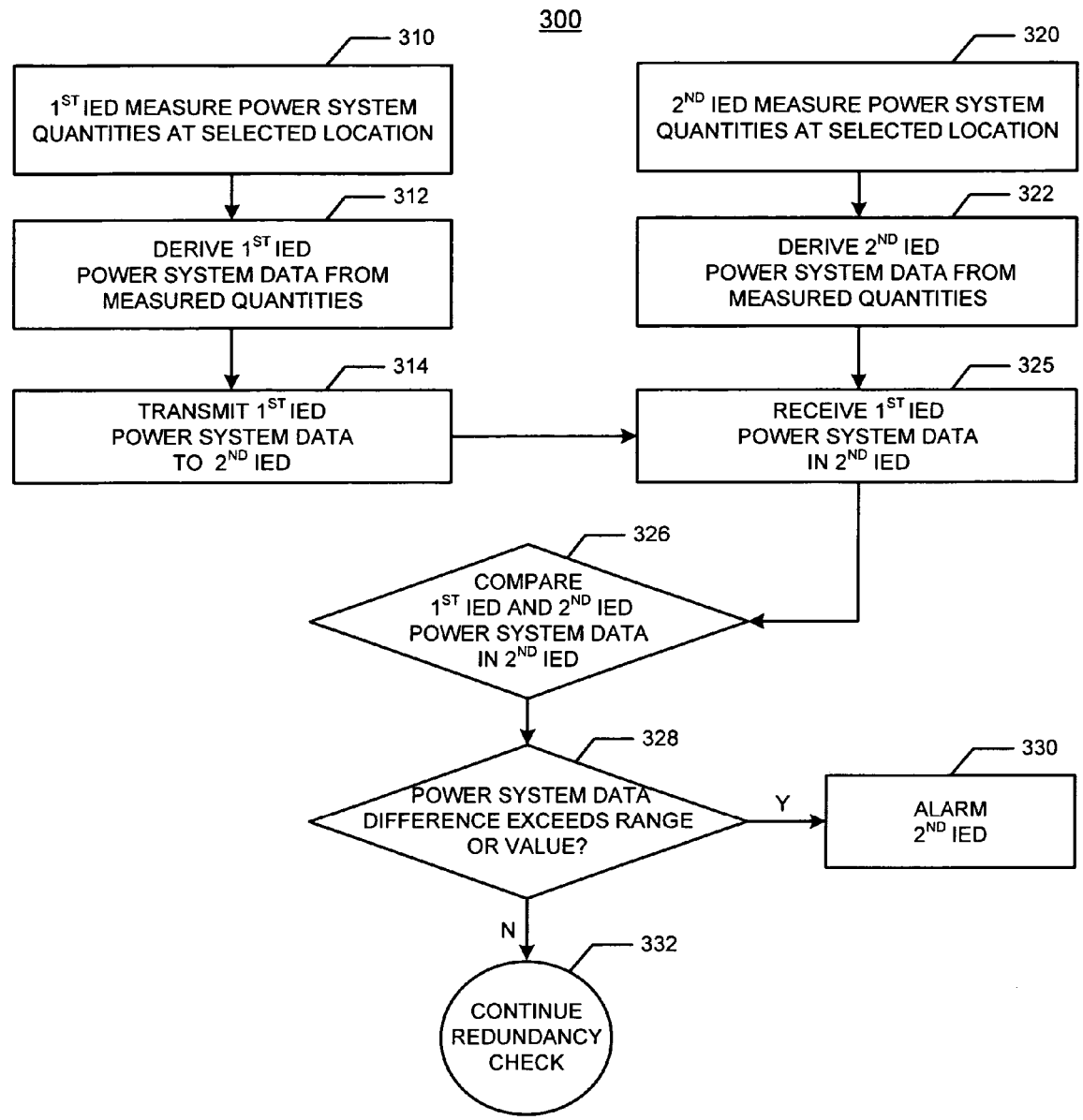
FIG. 6 is a flow chart depicting a general method for performing a power system data redundancy check.

FIG. 6 is a flow chart depicting a general method for performing a power system data redundancy check using measured power system quantities. This method applies to the embodiments including but not limited to FIGS. 3 and 4; wherein the first and second intelligent electronic devices may or may not be identical. Steps 310 and 320 take place concurrently in the first and second intelligent electronic devices measuring power system quantities at selected location, wherein the selected location may be at the same node or at different nodes some distance apart from each other. Steps 312 and 322 calculate and derive the power system data from each corresponding intelligent electronic device. Step 314 transmits the power system data of the first intelligent electronic device to the second intelligent electronic device and step 325 receives the first intelligent electronic device power system data in the second intelligent electronic device. In step 326, the second intelligent electronic device compares the received power system data from the first intelligent electronic device with its own power system data in a comparator. Step 328 determines if the difference between the power system data exceeds a select range or a value. If so, an alarm signal is sent by the second intelligent electronic devices in step 330; if not, the measurements and redundancy checks continue in step 332. This method may be further used to perform power system data redundancy check for subsequent intelligent electronic devices additions to the power system wherein each of the additional intelligent electronic devices transmit the corresponding power system data to the second intelligent electronic device through a communication link.

In all the embodiments, the functions of the signal converter, the counter, the transmit module, the receive module and the comparator may be discrete components or may be integrated and replaced by a single microcontroller.

It is further contemplated that any reference to a wired communication link includes any means for sending analog pulses, digitized serial or parallel data through direct channels to channel contacts, including, but not limited to, fiber channels, fiber optics, telephone lines, power line carrier, Ethernet networks, Local Optical Networks or any other type of suitable link adapted to carry time-integrated power system quantities, a digital signal or analog signal. Also, any reference to a wireless communication link includes any means for sending analog pulses, digitized serial or parallel data through indirect channels such as microwave links, RF links, audio, infrared links, or any type of suitable link adapted to carry time-integrated power system quantities, a digital signal or analog signal.

Figure 7:
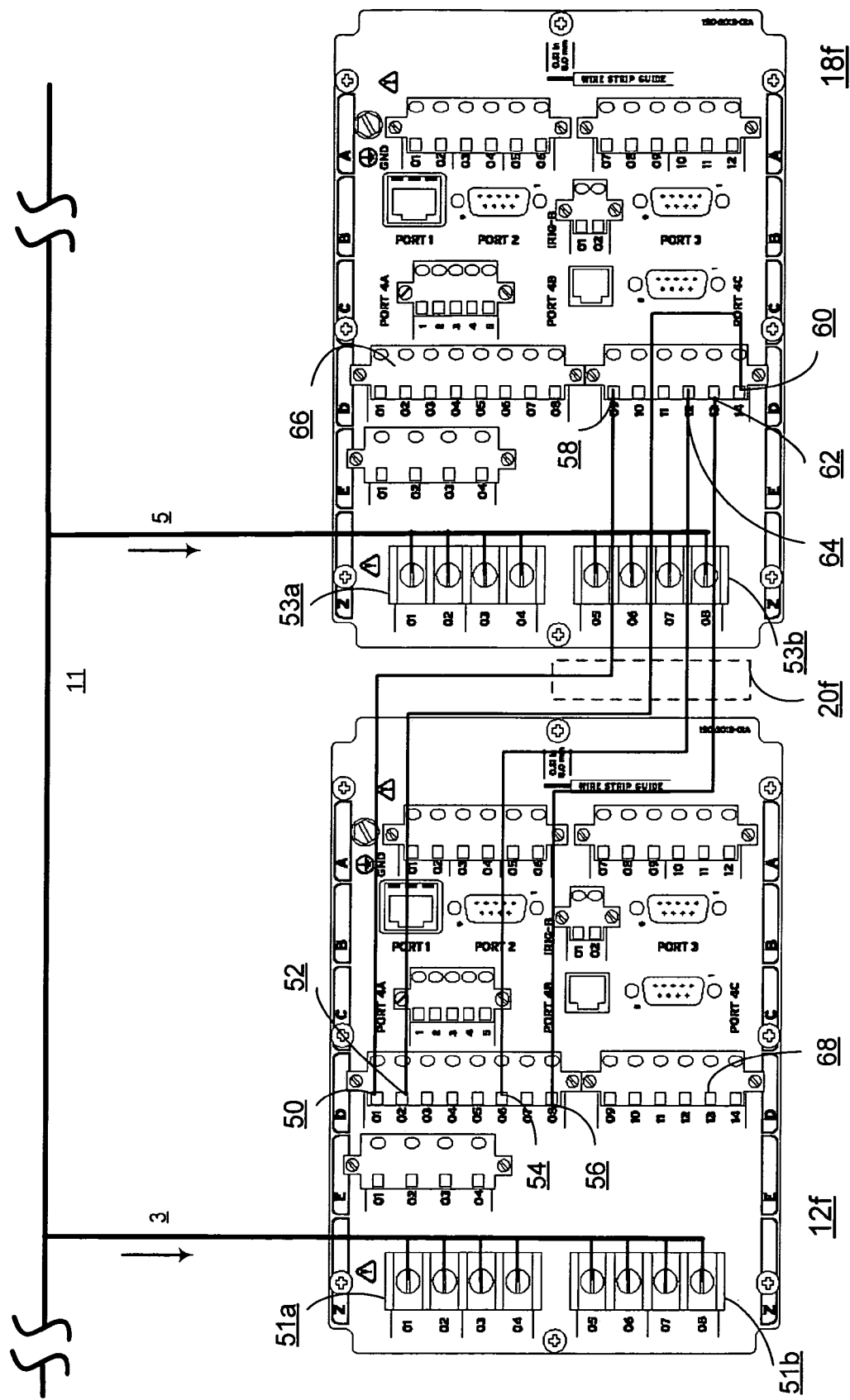
FIG. 7 is a rear view of an intelligent electronic device-to-intelligent electronic device having redundancy check functionality, illustrating a hard-wired communications link, according to one embodiment of the invention.

FIG. 7 is an example of a wired communication between two intelligent electronic devices in an arrangement whereupon a redundancy check may be achieved. In this arrangement, the first and second intelligent electronic devices are illustrated in the form of a first meter 12f and a second meter 18f, although other intelligent electronic devices may be used. The first meter 12f includes contact inputs 51a and 51b; and second meter 18f includes contact inputs 53a and 53b. First meter 12f contact outputs 50, 52, 54, 56 which are individually hard-wired to the second meter 18f via respective contact inputs 58, 60, 62, 64. In this arrangement, the hard-wires form the communications link 20f as described as reference numeral 20b of FIG. 3a. Signals transmitted between each meter 12f, 18f through such an arrangement are often referred to as KYZ pulses. Each contact output 50, 52, 54, 56 corresponds to a selected metered quantity (e.g., watts, VARs, amperes, etc.). For example, in order to provide for redundant metering using a wattage measurement, a contact output (e.g., contact output 50) corresponding to that quantity of the first meter 12f is individually hard-wired to a respective contact input (e.g., contact input 58) of the second meter 18f.

In this arrangement, the contact outputs 50, 52, 54, 56 are further coupled to a transmit module similar to that shown as reference numeral 16 of FIG. 3a, whereas the contact inputs 58, 60, 62, 64 are coupled a receive module similar to that shown as reference numeral 34 of FIG. 3a. The first and second intelligent electronic devices 12c, 18c of FIG. 3a (e.g., counter 24, comparator 36, etc. of FIG. 3) in order to provide a redundancy check.

In yet another embodiment, the contact outputs (shown generally at 66) of the second meter 18f may further be hard-wired to the first meter 12f via contact inputs (shown generally at 68) in order to provide for bidirectional communication therebetween and a concurrent redundancy check as discussed in greater detail above. In this arrangement, the first and second meters 12f, 18f may further include components similar to the first and second intelligent electronic devices 12f, 18f of FIG. 1 (e.g., counters 14, 24, comparator 26, 36, etc. of FIG. 1).

In another embodiment, it is further an object of the invention to provide a secure, noise resistant and tamperproof method for providing a redundancy check between intelligent electronic devices, whereupon only one communication link is required. In U.S. Pat. Nos. 5,793,750, 6,947,269 and U.S. patent application Ser. No. 11/211,816, the contents of which are hereby incorporated by reference discloses a serial communication system using successive data stream messages between two microprocessor-based protective relays for an electric power system. Each of the two relays in these systems has both transmit and receive modules for directly transmitting indication status bits indicative of the result of selected protective functions of one relay, from that one relay to the other, and vice versa. The same communication protocol may be implemented in any of the embodiments described herein in order to provide secure power system data communication for redundancy checks between intelligent electronic devices, as described below.

In this invention, an improved communication system is provided for a communication link between two intelligent electronic devices for performing a redundancy check therebetween. The system supports a communication arrangement or protocol involving eight data channels for exchange of output status indication bits between the two intelligent electronic devices both quickly and securely. The channel data bits TMB1-TMB8 identify eight transmit bits, on eight data channels.

Those bits, when received by the other intelligent electronic device, are identified as received channel data bits RMB1-RMB8, wherein RMB1-RMB8 are the "mirror" or replica of the transmit channel data bits. The eight data channels may accommodate at least eight output status indication bits. As indicated above, however, in many two-intelligent electronic device arrangements, only two or perhaps three channels are necessary to communicate the output status indication bits. Utilizing the present invention, the otherwise vacant channel space may now be used by selected additional data (discussed below) and an associated synchronization channel to synchronize the additional data.

The additional data may be digitized analog quantities, such as power system data, or may be "virtual terminal" data. For example, in providing for additional digitized analog data in metering applications, metering quantities such as watts, VARs, amperes, etc. may be communicated. In a similar example, in providing for a virtual terminal arrangement in metering applications, a human user or another application utilizes the direct communication link to communicate with the other meter. For example, the human user could utilize the direct communication link to control or query the other meter. An application such as, for example, an integration protocol like as DNP3, could also utilize the communication link in the virtual terminal arrangement.

Figure 8:
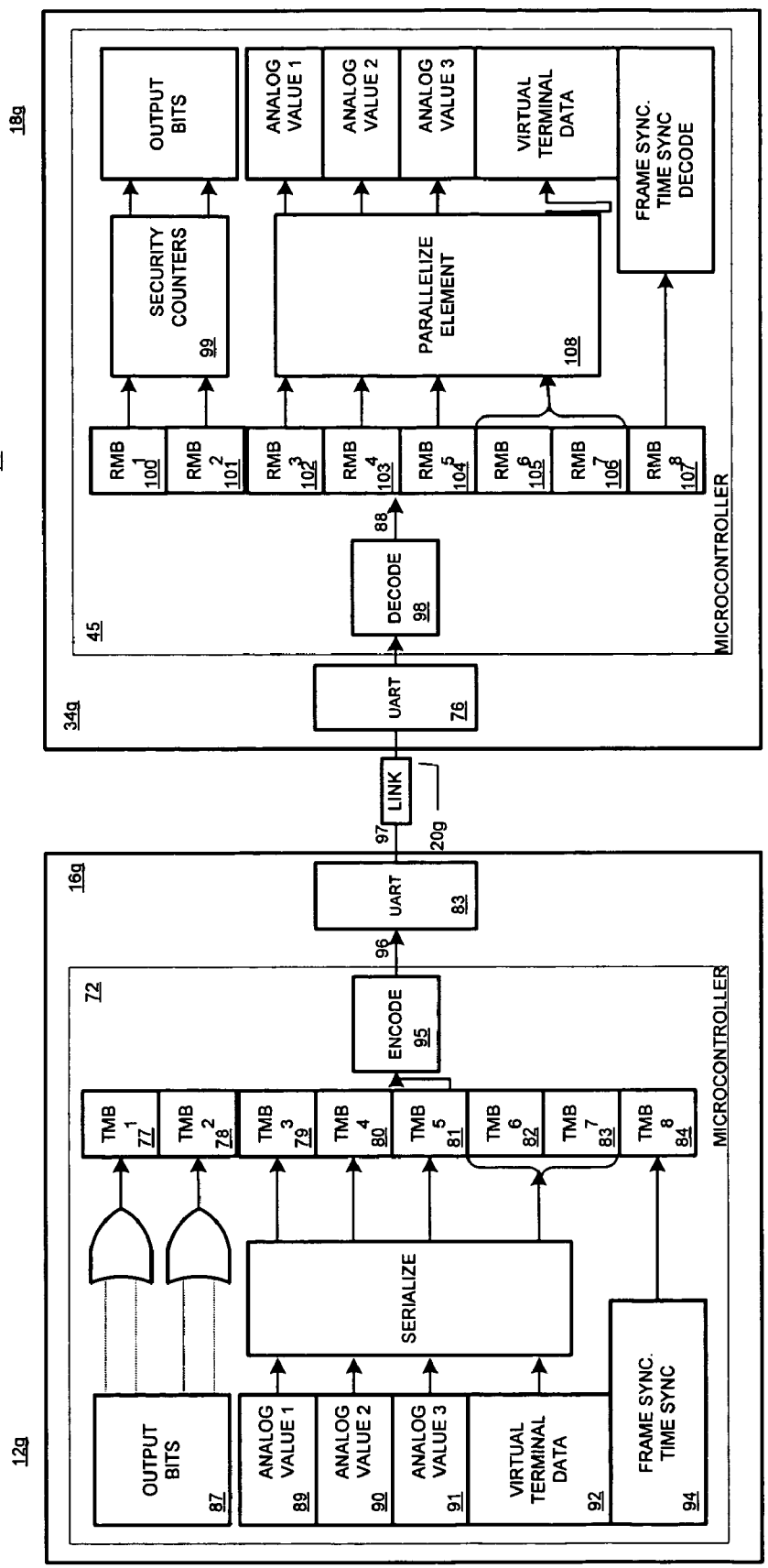
FIG. 8 is a block diagram of an intelligent electronic device-to-intelligent electronic device communication system according to another embodiment of the invention for performing a power system data redundancy check.

FIG. 8 is a block diagram of an intelligent electronic device-to-intelligent electronic device direct communication system 70 for performing a redundancy check therebetween, according to an embodiment of the invention. In this arrangement, a first intelligent electronic device 12g is in communication with a second intelligent electronic device 18g in order to provide redundant check functionality therebetween as described with respect to reference numerals 12 and 18 of the previous FIGS. 1 to 4 and with additional communications functionality as discussed below.

For ease of discussion, the first intelligent electronic device 12g is shown as the transmitting intelligent electronic device and includes, inter alia, a "transmit" module 16g, having a microcontroller 72 operatively coupled to a receive and transmit interface means; in this example, a universal asynchronous receiver/transmit (UART) 73. The (transmitting) UART 73 is configured to convert bytes of channel data bits (corresponding to the channel data) resulting from first intelligent electronic device operation into a single serial message stream for outbound transmission via the communication link 20g to the second intelligent electronic device 18g, and to convert an inbound serial message stream (from the second intelligent electronic device 18g) into bytes of channel data suitable for use by the first intelligent electronic device 12g. The communication link 20g may be similar to that as explained above with respect to reference numeral 20a in FIGS. 1 to 4.

Similarly, the second intelligent electronic device 18g is shown as the receiving intelligent electronic device and includes, inter alia, a "receive" module 34g having a second microcontroller 75 operatively coupled to another UART 76, operational and configured as described above. Although not separately illustrated, each of the first and second intelligent electronic devices 12g, 18g include both transmit and receive capability to enable bi-directional communication. While illustrated as transmit and receive modules 16g, 34g, in a functional block diagram format, the intelligent electronic device-to-intelligent electronic device direct communication system and method described herein may be enabled via a microprocessor or field programmable gate array (FPGA) executing a computer program, protection algorithm or other logic scheme. Further, although illustrated as a UART 73 operatively coupled to the first microcontroller 72, and a UART 76 operatively coupled to the second microcontroller 75, one of any suitable transmit and receive interface means may be utilized to convert bytes of channel data bits into a serial message stream for transmission via the communication link 20g.

The transmit module 16g and the receive module 34g are operatively connected via the communication link 20g. As noted above, the communication link 20g may be any type of suitable link adapted to carry analog or digitized analog data. As illustrated, in addition to output status indication bits, each of the transmit and receive modules 16g, 34g is capable of transmitting/receiving other types of channel data in the form of serial messages. For example, the channel data may include digitized analog values, derived from analog quantities that require more than a single bit such as power system information.

In one example, a system may be implemented in metering applications, whereupon this information would include metering information. In this particular example, typical metering information may include selected metering quantities such as watts, VARs, volt-amperes, frequency, harmonics, etc. In intelligent electronic devices which are adapted to provide for more than just metering functionality, the channel data may also include breaker failure system security enhancement information, reclose enable information, instrument transformer checking and multi-terminal fault location information, to name a few.

Referring to the transmit module 16g, an eight data channel arrangement is configured such that two data channels, a data channel 77 and a data channel 78, correspond to the conventional output status indication bits 87 transmitted as channel data bit 1 (TMB1) and TMB2, respectively, from the transmit module 16g of the first intelligent electronic device 12g to the receive module 34g of the second intelligent electronic device 18g. Three data channels, a data channel 79, a data channel 80 and a data channel 81, are dedicated to digitized analog values 89, 90 and 91 transmitted as channel data bits TMB3, TMB4 and TMB5, respectively, from the transmit module 16g of the first intelligent electronic device 12g to the receive module 34g of the second intelligent electronic device 18g.

Each of the digitized analog values 89, 90, 91 are formed by, for example, converting a 32-bit floating point number representing an analog quantity (e.g., system impedances, currents, voltages)) into an 18-bit floating point number. The 18-bit floating point number is then serialized such that one bit from each of the digitized analog values 89, 90, 91 is included as channel data bits TMB3, TMB4 and TMB5, respectively, in sequential transmitted messages until all of the bits associated with the digitized analog values 89, 90, 91 are transmitted. For example, if each of the digitized analog values 89, 90, 91 is expressed in 18 bits, eighteen sequential serial messages are transmitted where the first serial message includes the first bit of the digitized analog value 89 transmitted as channel data bit TMB3, the first bit of the digitized analog value 90 transmitted as channel data bit TMB4, and the first bit of the digitized analog value 91 transmitted as channel data bit TMB5. Similarly, the second serial message includes the second bit of the digitized analog value 89 transmitted as channel data bit TMB3, the second bit of the digitized analog value 90 transmitted as channel data bit TMB4, and the second bit of the digitized analog value 91 transmitted as channel data bit TMB5, and so on.

It should be noted that while compromising some precision, the conversion scheme that converts a 32-bit floating point number (representing the analog quantity) into a corresponding 18-bit floating point number, enables quicker transmission to the second intelligent electronic device 18g. It should also be noted that other conversion schemes may be utilized depending on the analog quantity measured, the precision required, and the speed of transmission desired.

Two additional data channels, a data channel 82 and a data channel 83 facilitate virtual terminal data transmitted as channel data bits TMB6 and TMB7, respectively, from the transmit module 16g of the first intelligent electronic device 12g to the receive module 34g of the second intelligent electronic device 18g. As noted above, virtual terminal data refers to data provided by a user located at a primary intelligent electronic device (e.g., the first intelligent electronic device 12g), to a secondary intelligent electronic device (e.g., the intelligent electronic device 18g) via the communication link 20g. In such a configuration, the primary intelligent electronic device operates as a virtual terminal to allow the user to query and/or control the secondary intelligent electronic device with the familiar serial port user interface passing data on otherwise unused channels. The virtual terminal scheme also adds fast operate capability. Like the digitized analog values described above, the virtual terminal data is serialized bit-by-bit such that, for example, 18-bit virtual terminal data is transmitted bit-by-bit in 18 sequential serial messages where the first two bits are payload flags and the last sixteen bits are two 8-bit data bytes. For example, the 18-bit virtual terminal data may be expressed as:

$p_1 p_2 d_{16} d_{15} d_{14} d_{13} d_{12} d_{11} d_{10} d_9 d_8 d_7 d_6 d_5 d_4 d_3 d_2 d_1$ where $p_1=1$ indicates that $d_1$-$d_8$ is a payload byte, $p_2=1$ indicates that $d_9$-$d_{16}$ is a payload byte.

The eighth data channel 84 is dedicated to synchronization information transmitted as channel data bit TMB8 from the transmit module 16g of the first intelligent electronic device 12g to the receive module 34g of the second intelligent electronic device 18g. The synchronization information enables synchronization of the data channels associated with the analog values 89, 90, 91 and the virtual terminal data 92. Thus, when any of the data channels 77-83 are used for anything other than the output status indication bits, a dedicated synchronous channel is allocated for synchronization information transmitted as channel data bit TMB8.

Although illustrated utilizing an eight data channel arrangement, it should be understood that a different number or arrangement and/or assignment of data channels may be used by the first and second intelligent electronic devices 12g, 18g of the communication system 70. Accordingly, the two data channels of output status indication bits in combination with the three data channels of analog values and the two data channels of virtual terminal data illustrated in FIG. 8 is arbitrary. The output status indication bits could occupy more or less or no data channels, the analog values could occupy more or less or no data channels, and the virtual terminal data could occupy more or less or no data channels. In addition, one analog value may occupy more than one data channel for speedier transmission. Similarly, virtual terminal data may occupy more than one data channel for speedier transmission.

Prior to transmission, each of the eight channel data bits TMB1-TMB8 are encoded by an encoder 95 to form an encoded message 96 using one of any number of suitable techniques. The encoded message 96 may therefore have one of any number of suitable formats, depending on the encoding scheme selected. For example, in one encoding scheme, the encoded message 96 may include 36 or 40 bits, divided into four 9-bit (for 36 bit length) or 10-bit (for 40 bit length) characters plus a number of idle bits. The number of idle bits may vary depending upon the selected transmission speed.

Continuing with the example, the bits may be assembled such that the first 9-10 bit character includes a single start bit followed by the six channel data bits TMB1-TMB6, followed by an odd parity bit and one or two stop bits, as selected by the user. The second character may include a second single start bit, followed by the six channel data bits TMB5, TMB6, TMB7, TMB8, TMB1 and TMB2, followed by an odd parity bit and one or two stop bits. The third character may include a start bit followed by the six channel data bits TMB7, TMB8, TMB1, TMB2, TMB3 and TMB4, followed by an odd parity bit and one or two stop bits. The fourth and final character in the message may include a single start bit followed by the six channel data bits TMB3-TMB8, followed by an odd parity bit and one or two stop bits. The remaining bits, if any, are a variable number of idle bits, depending upon transmission speed of the data.

Using such an encoding scheme, each of the channel data bits TMB1-TMB8 are repeated three times in the four character portions of one encoded message 96 with single stop and parity bits and one or two stop bits inserted between each character portion of the encoded message 96. This encoding scheme allows the receiving, or second intelligent electronic device 18g, to check for errors that may have occurred during transmission.

In addition to assembling the bits into messages, each of the first and second intelligent electronic devices 12g, 18g may be adapted to further encode and decode using an identifier pattern selected during system configuration. For example, if preprogrammed to include one particular identifier pattern, the transmit encoder 95 logically inverts one of the four characters in each of the messages as a means of encoding the identifier pattern into the message. As described below, the receiving, or second, intelligent electronic device 18g then ensures that the received message has been encoded with the correct identifier pattern. Although described as assembling messages where one character is logically inverted, it should be understood that other suitable formats and encoding schemes may be utilized by the encoder 95 to generate the encoded message 96.

The encoded message 96 is then applied to the UART 73, adapted to satisfy several operating parameters for the system. In general, the UART 73 converts the encoded message 96 into a serial message 97 for transmission as part of a serial message stream via the communication link 20g. Accordingly, the receiving UART 76 must also be capable of checking the received serial message 97 for proper framing (the presence of one stop bit per byte) and proper parity, and detecting overrun errors.

The UART 73 may be programmed for various baud rates. For example, it might be programmed for baud rates ranging from about 300 through about 115,000. The UART 73 is additionally adapted to synchronize both transmit and receive serial messages using transmit and receive clocks externally supplied. As will be appreciated by one skilled in the art, the method of bit synchronization, using start and stop bits or using synchronizing clocks, is one of any number of suitable methods for synchronization. For example, the clocks 42, 44 of FIGS. 1 and 2 may be used in such an arrangement.

Subsequent to being prepared for transmission by the UART 73, the serial message 97 is transmitted over the communication link 20g to the receive module 34g. In one example, when the first, or transmitting, intelligent electronic device 12g samples and performs its related functions every {fraction (1/16)}th of a power system cycle, each serial message 97 is sent at a 1 millisecond interval, reflecting the sampling rate of the transmitting intelligent electronic device. The sampling and transmission rates may be varied depending on the desired operation of the transmitting intelligent electronic device.

Referring now to the receive module 34g, the receiving UART 76 provides the counterpart functions of the transmitting UART 73. When the serial message 97 is received by the receive module 34g of the second intelligent electronic device 18g, the UART 76 performs several data checks on each character of the serial message 97. It also checks each character of the serial messages 97 for proper framing, parity and overrun errors.

From UART 76, the characters of the serial message 97 are passed to a decoder 98. In general, the decoder 98 reassembles groups of four characters in order to reconstruct the four-character message. Next, the decoder 98 checks each message for errors, and also examines the results of the UART checks described above. If any of the checks fail, the decoder 98 discards the message and de-asserts a DOK (data OK) flag for that message in a register.

More specifically, in the illustrated example, the decoder 98 ensures that there are the three copies of the eight channel data bits TMB1-TMB8 included in the transmitted four-character encoded message 96. If an identifier pattern was used to encode the encoded message 96, the decoder 98 also checks to ensure that the encoded message 96 includes the identifier pattern. It should be noted that the encoding/decoding scheme described above is one of any number of suitable encoding/decoding schemes to enable error detection that may be utilized in the method and apparatus of the invention.

As a result of operation of the decoder 98, a DOK flag and the channel data bits RMB1-RMB8 are provided. The received channel data bits RMB1-RMB8 are the mirror or replica of transmitted channel data bits TMB1-TMB8. The data OK (DOK) flag provides an indication of whether errors were detected in the received message.

Like the transmit module 16g of the first intelligent electronic device 12g, the receive module 34g of the second intelligent electronic device 18g includes an eight data channel arrangement where two data channels are dedicated to the output status indication bits, three data channels are dedicated to three digitized analog values, two data channels are dedicated to virtual terminal data and one data channel is dedicated to synchronization information. Accordingly, the output status indication bits 87 are received as channel data bits RMB1 and RMB2 via data channels 100 and 101, respectively, and are applied to one or more security counters 99. The security counters 99 operate to ensure that the state of the received channel data bits RMB1 and RMB2 remain constant for a pre-selected number of received serial messages 97 before the output status indication bits are utilized by downstream processes. Ensuring that the state of the output status indication bits remain constant increases the reliability and security associated with the output status indication bits 87.

Because the two channel data bits RMB1 and RMB2 are transmitted bit by bit, no synchronization of those bits is required. The channel data bits RMB1 and RMB2 are used by the second intelligent electronic device 18g to make determinations concerning operation of the first intelligent electronic device 12g. In the illustrated example, the digitized analog values 89, 90 and 91 are received as channel data bits RMB3, RMB4, and RMB5 via a data channel 102, a channel 103 and a channel 104, respectively. Each of the three digitized analog values 89, 90, 91 are received serially one bit per message per data channel, and are then parallelized in a parallelize element 108. The parallelize element 108 re-assembles each of the three digitized analog values from received successive decoded messages 88. As noted above, in the illustrated example, each of the digitized analog values 89, 90, 91 includes eighteen bits. In an embodiment, sixteen bits are used for information while the remaining two bits are unused. Therefore, for every 18 messages, a complete original analog value is received on each corresponding data channel.

Similarly, the virtual terminal data 92 is received as channel data bits RMB6 and RMB7 via data channels 105 and 106, respectively. Like the analog values 89, 90, 91, the virtual terminal data 92 is received serially one bit per message per data channel, and is also parallelized in the parallelize element 108. In the illustrated embodiment, the virtual terminal data 92 includes eighteen bits. Sixteen bits of the eighteen bits are utilized for virtual terminal data, where the sixteen bits are divided into two eight-bit bytes. The two remaining bits are used to indicate which of the two eight-bit byte fields actually contain virtual terminal data, and which, if any, are idle, (e.g., waiting for user input). Thus, for every 18 decoded messages 88, two virtual terminal bytes are received on each corresponding data channel 105, 106. After parallelization via the parallelize element 108, the analog values and the virtual terminal data are provided to the second intelligent electronic device 18c.

Again, the particular arrangement of the eight data channel bits TMB1-TMB8 is established in accordance with the user's communication requirements. Different numbers of output status indication bits, analog values and virtual terminal data may be utilized to form seven bits of the eight channel data bits TMB1-TMB8.

A data channel 107, or synchronization channel, is dedicated to the remaining channel data bit, RMB8. The channel data bits RMB8 of the synchronization channel enable the receiving decoder 98 and parallelize element 108 to find the start and stop boundaries serial messages that include the digitized analog values and virtual terminal data. The synchronization channel is necessary when any of the other channel data bits include the digitized analog values or the virtual terminal data. If all of the channel data bits are used for output status indication bits only, no synchronization is necessary and the data channel 107 may be used for output status indication bits.

In order to determine that a complete (four character) bit message has been received, the second intelligent electronic device 18g identifies the first byte of each of the bit messages via message synchronization. In an embodiment, message synchronization is maintained by counting modulo 4 from the first received byte after byte synchronization is achieved. Accordingly, each time the counter rolls over, the first byte is received.

In an illustration of providing for a redundancy check using one or more intelligent electronic devices adapted to transmit and receive indication status bits in the form of successive data messages, the first and second intelligent electronic devices 12g, 18g of FIG. 8 may include any other the functionality of the embodiments of the intelligent electronic devices of the previous figures. For example, the first intelligent electronic device 12g may further include a receive module, whereas the second intelligent electronic device 18g may further include a transmit module in order to provide for bi-directional communication therebetween and a concurrent redundancy check as discussed in greater detail above. In other embodiments, the arrangement of FIG. 8 may further be associated with among other things an alarm, monitoring/control apparatus, and a clock as discussed with respect to the multiple embodiments associated with the previous figures.

In accordance with the multiple embodiments described above with respect to the teachings of FIG. 8, the direct communication system allows for real-time monitoring of the derived data associated with a selected portion of a power system. For example, using a typical arrangement as described in one of the embodiments, channel data communicated between intelligent electronic devices may be transferred at rates typically faster than about 4 ms at a rate of up to about 115,000 Baud. With the channel data being transferred in this manner, the response time for an alarm condition is typically less than about 12 ms.

Figure 9:
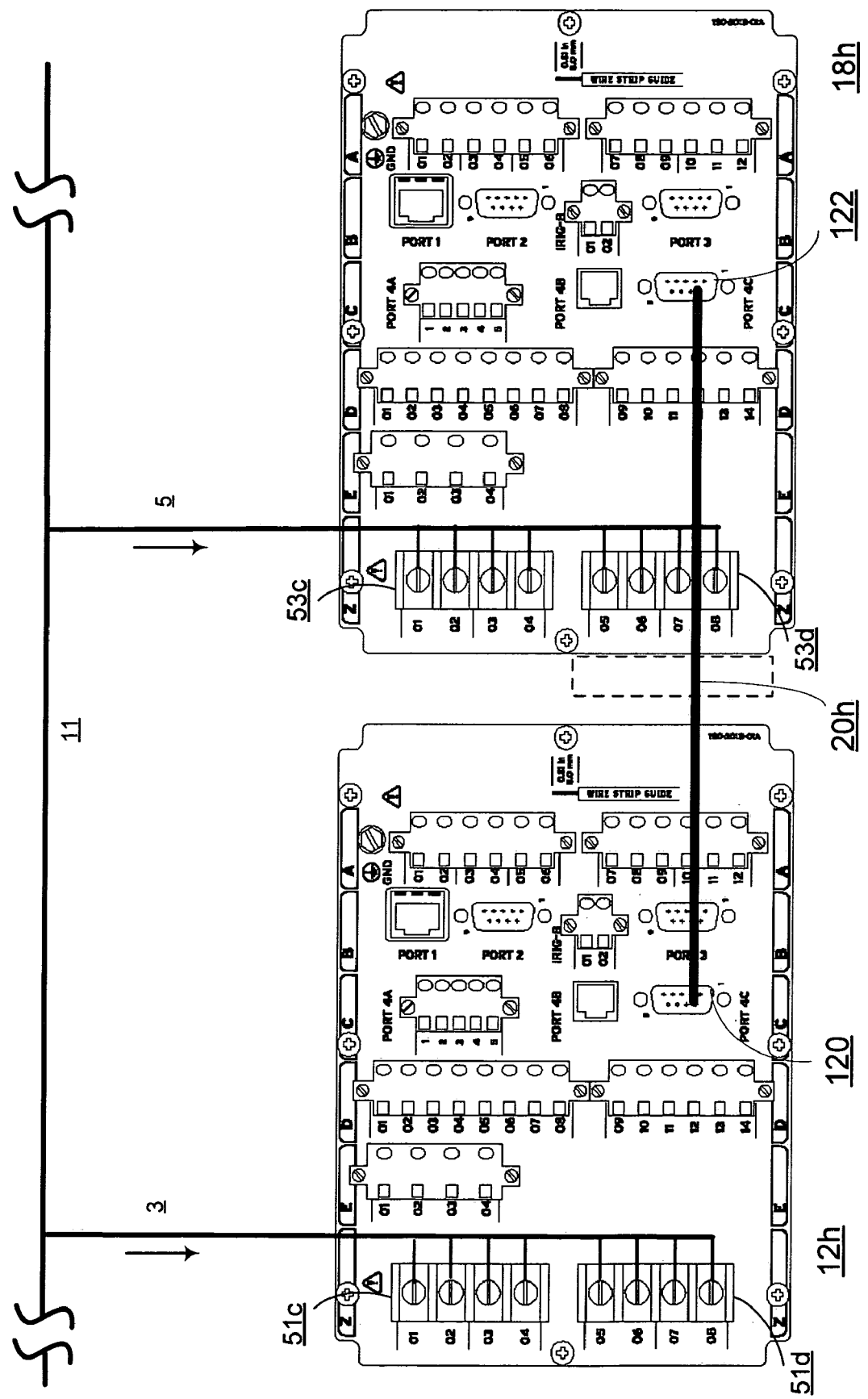
FIG. 9 is a rear view of an intelligent electronic device-to-intelligent electronic device having redundancy check functionality, illustrating a typical communications link used with regards to the embodiment of FIG. 8.

FIG. 9 illustrates a meter-to-meter external connection in accordance to the embodiment of the invention as illustrated in FIG. 8 as explained above. In this arrangement, the first and second intelligent electronic devices of FIG. 8 may be in the form of a first meter 12h and a second meter 18h. The first meter 12h includes contact inputs 51c and 51d; and second meter 18h includes contact inputs 53c and 53d. The first meter 12h includes a port 120, whereas the second meter 18h includes a port 122 for connecting the two intelligent electronic devices therebetween via a suitable communications link 20h as discussed above.

In this arrangement, the port 120 of the first intelligent electronic device 12h is further coupled to a transmit module similar to that shown as reference numeral 16 of the previous figures, whereas the port 122 is coupled a receive module similar to that shown as reference numeral 34 of the previous figures. The first and second meters 12h, 18h may further include components similar to the first and second intelligent electronic devices 12, 18 of the previous figures (e.g., counters 12, 18, comparator 26, etc. of FIG. 1) in order to provide a redundancy check.

In yet another embodiment, the port 122 may further be coupled to a transmit module similar to that shown as reference numeral 32 of the previous figures, whereas the port 120 may further be coupled to a receive module similar to that shown as reference numeral 22 in order to provide for bi-directional communication therebetween and a concurrent redundancy check as discussed in greater detail above. Accordingly, this arrangement provides for bi-directional communication using only one communication link.

Although the systems and methods described above involve meters, the present invention should not be narrowly construed and may be extended to any intelligent electronic device measuring and communicating power system quantities to perform redundancy checks. Examples of such intelligent electronic devices may include among other things protective relays, recloser controls, I/O processor and controllers, communication processors, Synchrophasors and capacitor bank controllers.

It should be understood that various changes, modifications and substitutions might be incorporated in the embodiments by those skilled in the art to achieve the function of power system data redundancy check without departing from the scope of the invention, which are defined by the claims which follow.

What is claimed is:

1. An intelligent electronic device-to-intelligent electronic device direct communication system in a power system, the intelligent electronic device-to-intelligent electronic device direct communication system comprising:

a first intelligent electronic device which derives power system data from a selected portion of the power system, the first intelligent electronic device being associated with a first transmit module which transmits the derived power system data; and a second intelligent electronic device which derives power system data from the selected portion of the power system, the second intelligent electronic device being associated with a first receive module, wherein the first receive module of the second intelligent electronic device is coupled to the first transmit module of the first intelligent electronic device via a communication link, such that the first receive module receives the derived power system data transmitted by the first intelligent electronic device, and wherein the second intelligent electronic device provides a redundancy check between the first and second intelligent electronic devices by comparing the power system data derived by the second intelligent electronic device with the power system data transmitted thereto from the first intelligent electronic device.

2. The intelligent electronic device-to-intelligent electronic device direct communication system of claim 1, wherein the first transmit module further includes a first microcontroller which provides a plurality of data channels, each of the plurality of data channels being associated with the power system data and having a variety of bit-lengths in the form of successive data stream messages.

3. The intelligent electronic device-to-intelligent electronic device direct communication system of claim 2, wherein the first receive module further includes a second microcontroller which provides a plurality of data channels, thereby being adapted to receive the power system data having a variety of bit-lengths in the form of successive data stream messages being transmitted by the first transmit module.

4. The intelligent electronic device-to-intelligent electronic device direct communication system of claim 1, wherein the first intelligent electronic device is further associated with a second receive module and the second intelligent electronic device is further associated with a second transmit module to enable bidirectional transmission.

5. The intelligent electronic device-to-intelligent electronic device direct communication system of claim 1, wherein the second intelligent electronic device further comprises a comparator which compares the power system data received from the first intelligent electronic device to the power system data derived by the second intelligent electronic device, thereby providing a redundancy check between the first and second intelligent electronic devices.

6. The intelligent electronic device-to-intelligent electronic device direct communication system of claim 1, wherein at least one of the intelligent electronic devices is further associated with an alarm which signals a select condition.

7. The intelligent electronic device-to-intelligent electronic device direct communication system of claim 6, wherein the condition for signaling is selected from the group consisting of signaling when the difference between the power system data exceeds a select value, signaling when the communication link is severed, signaling when there is a power loss in any of the intelligent electronic devices, and signaling when there is a failure in any of the intelligent electronic devices.

8. The intelligent electronic device-to-intelligent electronic device direct communication system of claim 1, further comprising a monitoring apparatus which monitors one of the intelligent electronic devices.

9. The intelligent electronic device-to-intelligent electronic device direct communication system of claim 1, further comprising a control apparatus which controls one of the intelligent electronic devices.

10. The intelligent electronic device-to-intelligent electronic device direct communication system of claim 3, wherein each of the first and second intelligent electronic devices further includes a transmit and receive interface which converts between bytes of power system data bits and the plurality of serial messages transmitted via the communication link, the bytes of power system data bits corresponding to the selected power system data.

11. The intelligent electronic device-to-intelligent electronic device direct communication system of claim 10, wherein each of the plurality of serial messages includes a number of fixed formatted characters that include the power system data bits.

12. The intelligent electronic device-to-intelligent electronic device direct communication system of claim 10, wherein subsequent to receipt by the first receive module, each of the plurality of serial messages are decoded and parallelized to form a decoded message, sequential decoded messages re-forming the power system data.

13. The intelligent electronic device-to-intelligent electronic device direct communication system of claim 1, wherein at least one of the intelligent electronic devices includes metering functionality.

14. The intelligent electronic device-to-intelligent electronic device direct communication system of claim 1, wherein the power system data is derived from the group of power system quantities consisting of watts, VARs, volt-amperes, volts, amperes, frequency, harmonics, vectors of voltages, and vectors of currents.

15. The intelligent electronic device-to-intelligent electronic device direct communication system of claim 1, wherein the power system data is derived from the group of time-integrated power system quantities consisting of watt-hours, VAR-hours, volt-ampere-hours, volt-hours, and ampere-hours.

16. The intelligent electronic device-to-intelligent electronic device direct communication system of claim 1, wherein the power system data is transmitted in the group of formats consisting of KYZ pulses, analog signals, parallel digital data, serial digital data, and time-synchronized digitized analog data.

17. The intelligent electronic device-to-intelligent electronic device direct communication system of claim 1, wherein the communication link is a wired communication link.

18. The intelligent electronic device-to-intelligent electronic device direct communication system of claim 1, wherein the communication link is a wireless communication link.

19. The intelligent electronic device-to-intelligent electronic device direct communication system of claim 1, wherein the communication link is selected from the group consisting of a serial link, RF link, microwave link, audio link, infrared link, fiber optic link, channel to channel contact, fiber channel, telephone line, power line carrier, local network, wide-area network, local optical networks and Ethernet.

20. The intelligent electronic device-to-intelligent electronic device direct communication system of claim 1, further comprising a clock associated with at least one of the intelligent electronic devices, wherein the respective intelligent electronic device associated therewith is adapted to synchronize the transmitted and received selected power system data.

21. The intelligent electronic device-to-intelligent electronic device communication system of claim 3, wherein the plurality of data channels comprises eight data channels.

22. The intelligent electronic device-to-intelligent electronic device communication system of claim 1, wherein at least one of the intelligent electronic devices is selected from the group of intelligent electronic devices consisting of a meter, protective relay, recloser control, I/O processor and controller, communication processor, Synchrophasor and a capacitor bank controller.

23. The intelligent electronic device-to-intelligent electronic device communication system of claim 3, wherein the first receive module is further adapted to receive the successive data messages to produce replicated power system data, wherein the speed and security of the replicated power system data is approximately at least as good as that for the power system data.

24. The intelligent electronic device-to-intelligent electronic device communication system of claim 1, wherein the first intelligent electronic device is separate, but in communication with, the first transmit module.

25. The intelligent electronic device-to-intelligent electronic device communication system of claim 1, wherein the first intelligent electronic device includes the first transmit module.

26. The intelligent electronic device-to-intelligent electronic device communication system of claim 1, wherein the second intelligent electronic device is separate, but in communication with, the first receive module.

27. The intelligent electronic device-to-intelligent electronic device communication system of claim 1, wherein the second intelligent electronic device includes the first receive module.

28. The intelligent electronic device-to-intelligent electronic device communication system of claim 1, wherein the first intelligent electronic device derives power system data in the form of KYZ pulses, and wherein the second intelligent electronic device derives power system data in the form of time-integrated power system quantities such that the second intelligent electronic device provides a redundancy check between the first and second intelligent electronic devices by comparing the time-integrated power system quantities derived by the second intelligent electronic device with the KYZ pulses transmitted thereto from the first intelligent electronic device.

29. The intelligent electronic device-to-intelligent electronic device communication system of claim 1, wherein both the first and second intelligent electronic devices derive power system data in the form of KYZ pulses such that the second intelligent electronic device provides a redundancy check between the first and second intelligent electronic devices by comparing the KYZ pulses derived by the second intelligent electronic device with the KYZ pulses transmitted thereto from the first intelligent electronic device.

30. The intelligent electronic device-to-intelligent electronic device communication system of claim 1, wherein both the first and second intelligent electronic devices derive power system data in the form of time-integrated power system quantities such that the second intelligent electronic device provides a redundancy check between the first and second intelligent electronic devices by comparing the time-integrated power system quantities derived by the second intelligent electronic device with the time-integrated power system quantities transmitted thereto from the first intelligent electronic device.

31. A first intelligent electronic device for use in an intelligent electronic device-to-intelligent electronic device direct communication system in a power system, wherein the intelligent electronic device-to-intelligent electronic device direct communication system includes a second intelligent electronic device associated with a first receive module including a first microcontroller which provides a plurality of data channels, each of the plurality of data channels associated with power system data having a variety of bit-lengths in the form of successive data stream messages, the first receive module further receiving the power system data transmitted thereto, the first intelligent electronic device comprising:

a first transmit module including a second microcontroller which provides the plurality of data channels, each of the plurality of data channels associated with power system data having a variety of bit-lengths in the form of successive data stream messages, wherein the first transmit module transmits channel data to the second intelligent electronic device, thereby providing a redundancy check between the first and second intelligent electronic devices.

32. The first intelligent electronic device of claim 31, further comprising a second receive module which receives transmitted power system data.

33. The first intelligent electronic device of claim 32, further comprising a comparator which compares the received power system data to the transmitted power system data.

34. The first intelligent electronic device of claim 33, further comprising an alarm which signals when the difference between the received and transmitted power system data exceeds a selected value or range.

35. The first intelligent electronic device of claim 31, further comprising a clock, wherein the second microcontroller associated therewith is adapted to synchronize the transmitted and received selected power system data.

36. The first intelligent electronic device of claim 31, wherein said intelligent electronic device is selected from the group of intelligent electronic devices consisting of a meter, protective relay, recloser control, I/O processor and controller, communication processor, Synchrophasor and a capacitor bank controller.

37. A secondary intelligent electronic device for use in an intelligent electronic device-to-intelligent electronic device direct communication system in a power system, wherein the intelligent electronic device-to-intelligent electronic device direct communication system includes a first intelligent electronic device which derives power system data from a selected portion of the power system, the first intelligent electronic device being associated with a transmit module which transmits the derived power system data, the secondary intelligent electronic device comprising:

a device which derives power system data from the selected portion of the power system, a receive module which receives the power system data transmitted by the first transmit module of the first intelligent electronic device, a comparator coupled to the receive module and the device which derives power system data, wherein the comparator compares the power system data derived by the sampling instrument with the power system data received from the first intelligent electronic device, thereby providing a redundancy check between the first and secondary intelligent electronic devices.

38. The secondary intelligent electronic device of claim 37, wherein the receive module further includes a microcontroller which provides a plurality of data channels, each of the plurality of data channels associated with the power system data and having a variety of bit-lengths in the form of successive data stream messages.

39. The secondary intelligent electronic device of claim 37, further comprising a transmit module which transmits the power system data derived by the sampling instrument.

40. The secondary intelligent electronic device of claim 39, wherein the transmit module of the secondary intelligent electronic device further includes a microcontroller which provides a plurality of data channels, each of the plurality of data channels associated with the power system data and having a variety of bit-lengths in the form of successive data stream messages.

41. The secondary intelligent electronic device of claim 37, further comprising an alarm which signals when the difference between the power system data received from the first intelligent electronic device and the power system data derived by the secondary intelligent electronic device exceeds a selected value or range.

42. The secondary intelligent electronic device of claim 37, further comprising a clock synchronize the transmitted and received selected power system data.

43. The secondary intelligent electronic device of claim 37, wherein the secondary intelligent electronic device is selected from the group of intelligent electronic devices consisting of a meter, protective relay, recloser control, I/O processor and controller, communication processor, Synchrophasor and a capacitor bank controller.

44. The secondary intelligent electronic device of claim 37, wherein the receive module is further receives the successive data messages to produce replicated power system data, wherein the speed and security of the replicated power system data is approximately at least as good as that for the power system data.

45. A method of performing a redundancy check between a first intelligent electronic device and a second intelligent electronic device, the method comprising the steps of:

deriving power system data from a selected portion of a power system using the first intelligent electronic device;

transmitting, via a communication link, the power system data from the first intelligent electronic device to the second intelligent electronic device;

receiving the power system data from the first intelligent electronic device using the second intelligent electronic device;

deriving power system data from the selected portion of the power system using the second intelligent electronic device; and comparing, via a comparator in the second intelligent electronic device, the power system data by the second intelligent electronic device with the power system data transmitted by the first intelligent electronic device.

46. The method of performing a redundancy check between a first intelligent electronic device and a second intelligent electronic device of claim 45, wherein the power system data is transmitted from the first intelligent electronic device to the second intelligent electronic device via successive data stream messages.

47. The method of providing a redundancy check between a first intelligent electronic device and a second intelligent electronic device of claim 45, further comprising the step of signaling an alarm if the difference of the power system data by the second intelligent electronic device and the power system data transmitted by the first intelligent electronic device exceeds a selected value or range.

48. The method of providing a redundancy check between a first intelligent electronic device and a second intelligent electronic device of claim 45, wherein at least one of the intelligent electronic devices is selected from the group of intelligent electronic devices consisting of a meter, protective relay, recloser control, I/O processor and controller, communication processor, Synchrophasor and a capacitor bank controller.

49. The method of providing a redundancy check between a first intelligent electronic device and a second intelligent electronic device of claim 46, further comprising decoding the data stream messages.

50. The method of providing a redundancy check between a first intelligent electronic device and a second intelligent electronic device of claim 45, wherein the power system data is selected from the group of power system quantities consisting of watts, VARs, volt-amperes, volts, amperes, frequency, harmonics, vectors of voltages, and vectors of currents.

51. The method of providing a redundancy check between a first intelligent electronic device and a second intelligent electronic device of claim 45, wherein the power system data is selected from the group of time-integrated power system quantities consisting of Watt-hours, VAR-hours, volt-ampere-hours, volt-hours, and ampere-hours.

52. The method of providing a redundancy check between a first intelligent electronic device and a second intelligent electronic device of claim 45, wherein the power system data is transmitted in the group of formats consisting of KYZ pulses, analog signals, parallel digital data, serial digital data, and time-synchronized digitized analog data.

53. The method of providing a redundancy check between a first intelligent electronic device and a second intelligent electronic device of claim 45, wherein the communication link is selected from the group consisting of a serial link, RF link, microwave link, audio link, infrared link, fiber optic link, channel to channel contact, fiber channel, telephone line, power line carrier, local network, wide-area network, local optical networks and Ethernet.

54. The method of providing a redundancy check between a first intelligent electronic device and a second intelligent electronic device of claim 45, wherein the first and second intelligent electronic devices are substantially similar in functions to enable bi-directional transmission and receiving of power system data.

55. The method of providing a redundancy check between a first intelligent electronic device and a second intelligent electronic device of claim 45, wherein respective additional intelligent electronic devices can communicate to the second intelligent electronic device to perform respective redundancy checks.

* * * * *